(12) United States Patent
Nakasyouya

(10) Patent No.: US 12,428,323 B2
(45) Date of Patent: Sep. 30, 2025

(54) MICROBUBBLES AMPLIFIER

(71) Applicant: TENSOU ELECTROMAGNETIC TECHNOLOGY INDUSTRY CO., LTD., Osaka (JP)

(72) Inventor: Hideo Nakasyouya, Osaka (JP)

(73) Assignee: TENSOU ELECTROMAGNETIC TECHNOLOGY INDUSTRY CO., LTD., Osaka (JP)

( * ) Notice: Subject to any disclaimer, the term of this patent is extended or adjusted under 35 U.S.C. 154(b) by 0 days.

(21) Appl. No.: 18/730,486

(22) PCT Filed: Jan. 23, 2023

(86) PCT No.: PCT/JP2023/001834
§ 371 (c)(1),
(2) Date: Jul. 19, 2024

(87) PCT Pub. No.: WO2023/145669
PCT Pub. Date: Aug. 3, 2023

(65) Prior Publication Data
US 2025/0100914 A1    Mar. 27, 2025

(30) Foreign Application Priority Data
Jan. 27, 2022  (JP) ................. 2022-010587

(51) Int. Cl.
C02F 1/461 (2023.01)
C02F 1/00 (2023.01)
C02F 1/48 (2023.01)

(52) U.S. Cl.
CPC .............. *C02F 1/482* (2013.01); *C02F 1/005* (2013.01); *C02F 1/46104* (2013.01); *C02F 2301/026* (2013.01)

(58) Field of Classification Search
CPC ............................ C02F 1/482; C02F 1/46104
See application file for complete search history.

(56) References Cited

FOREIGN PATENT DOCUMENTS

| JP | 62-186987 | 8/1987 |
|---|---|---|
| JP | 1-120999 | 8/1989 |
| JP | 2-100696 | 8/1990 |

(Continued)

OTHER PUBLICATIONS

Yamaji et al—JP 2010253415 A machine translation (Year: 2010).*

(Continued)

*Primary Examiner* — Bradley R Spies
(74) *Attorney, Agent, or Firm* — Wenderoth, Lind & Ponack, L.L.P.

(57) ABSTRACT

As a fine bubble amplifier capable of treating a large amount of electrolyzed water, the present invention provides a fine bubble amplifier 100 that amplifies fine bubbles in an electrolytic liquid A. The fine bubble amplifier 100 includes a flow-feeding pipe 1 that is made of metal and flow-feeds the electrolytic liquid A and one or a plurality of magnets 21 that are arranged radially outside the flow-feeding pipe 1. The flow-feeding pipe 1 has an axis perpendicular cross section of circular shape and has a recessed groove 1a extending in a circumferential direction in an inner circumferential surface and a magnetic flux of not less than 99 mT is formed in at least a portion of a space inside the recessed groove 1a by the magnets 21.

2 Claims, 6 Drawing Sheets

(56) References Cited

FOREIGN PATENT DOCUMENTS

| | | |
|---|---|---|
| JP | 2000-325963 A | 11/2000 |
| JP | 3089637 | 10/2002 |
| JP | 2006-212490 | 8/2006 |
| JP | 2010-179229 | 8/2010 |
| JP | 2010-253415 | 11/2010 |
| JP | 3176175 | 6/2012 |
| JP | 2018-20313 | 2/2018 |
| JP | 2020-69461 | 5/2020 |
| JP | 2020-151640 | 9/2020 |
| JP | 2021-10908 | 2/2021 |
| JP | 2021-120205 | 8/2021 |
| WO | 2014/148397 | 9/2014 |

OTHER PUBLICATIONS

Iwasaki et al—JP S62186987 A machine translation (Year: 1987).*
International Search Report issued Mar. 20, 2023 in corresponding International Application No. PCT/JP2023/001834.
Decision to Grant a Patent issued January 17, 2023 in corresponding Japanese Application No. 2022-010587 (with English translation).

* cited by examiner

MICROBUBBLES AMPLIFIER

TECHNICAL FIELD

The present invention relates to an art of generating or amplifying fine bubbles called microbubbles, ultrafine bubbles, etc. in a liquid and particularly relates to an art of generating or amplifying fine bubbles by electrolyzing an electrolytic liquid.

BACKGROUND ART

Conventionally, methods for generating fine bubbles constituted of hydrogen and oxygen in water by electrolyzing water are known (see Patent Literatures 1 to Patent Literatures 5).

For example, in Patent Literature 1, a fine bubble generator that electrolyzes water using titanium as an anode and platinum as a cathode is proposed and in Patent Literature 2, a fine bubble generator using titanium as a cathode and platinum or titanium with a surface coated with platinum as an anode is proposed.

With the fine bubble generators of Patent Literature 1 and Patent Literature 2, there is a problem in that an oxide film forms on an anode surface and therefore, in Patent Literature 3, the present inventor proposed a fine bubble generator arranged such that an interior of a pipe through which flowing water subject to electrolysis passes is filled with a large number of charcoal chips and oxide film formation on an electrode is suppressed by a reducing power of the charcoal chips.

The fine bubble generator of Patent Literature 3 has a problem in being unwieldy due to the device being made large by a battery and a problem of being incapable of use when the battery runs out and therefore, the present inventor further proposed, in Patent Literature 4, a fine bubble generator arranged such that a flow passage through which water flows is filled with chips of Bincho charcoal and spheres of stainless steel, a magnetic field is applied in a direction intersecting the flowing water to generate an electromotive force of vortex shape inside the flowing water, and the water is electrolyzed at surfaces of the Bincho charcoal and stainless steel spheres by the electromotive force.

However, with the fine bubble generator according to Patent Literature 4, there is a problem in that since a sufficient water flow cannot be secured due to resistance of the Bincho charcoal chips and stainless spheres filled in the flow passage, flow passages must be arranged in parallel and the device is made large and also, due to rust of piping and impurities clogging gaps between the chips, etc., there is a problem of the water flow decreasing with use and a problem of degradation of water quality.

Although unpublished at the time of filing of the present application, the present inventor proposed in Patent Literature 5, a fine bubble amplifier capable of amplifying fine bubbles without the use of Bincho charcoal by arranging a flow-feeding pipe made of metal for flow-feeding an electrolytic liquid to be of a flat shape and arranging a pair of magnets in a width direction sandwiching the flow-feeding pipe such that N poles face S poles.

CITATION LIST

Patent Literatures

Patent Literature 1: International Publication No. WO 2014/148397
Patent Literature 2: Japanese Published Unexamined Patent Application No. 2018-020313
Patent Literature 3: Japanese Published Unexamined Patent Application No. 2020-151640
Patent Literature 4: Japanese Published Unexamined Patent Application No. 2021-010908
Patent Literature 5: Japanese Patent Application No. 2021-120205

SUMMARY OF INVENTION

Technical Problem

However, with the fine bubble amplifier of Patent Literature 5, there is a problem in that since the flow-feeding pipe that is flat must be used and a flow rate of the electrolytic liquid is restricted in comparison to a circular pipe, when treatment of a large amount of electrolytic liquid is necessary, for example, as in treating water supplied to a large bathhouse, etc., a need to arrange flow-feeding pipes in parallel arises and the device becomes large after all.

The present invention has been made in view of the above problem and an object thereof is to provide a fine bubble amplifier capable of treating a large amount of an electrolytic liquid.

Solution to Problem

The invention made to solve the above problem is a fine bubble amplifier amplifying fine bubbles in an electrolytic liquid and characterized in including a flow-feeding pipe that is made of metal, flow-feeds the electrolytic liquid, and extends rectilinearly and a plurality of magnets that are arranged radially outside the flow-feeding pipe and in that the magnets are constituted of a plurality of pair of magnets arranged with respective N poles and S poles facing each other across the rectilinearly extending flow-feeding pipe and such that facing orientations of the N poles and the S poles of the magnets adjacent in a length direction of the flow-feeding pipe are reversed, the flow-feeding pipe has an axis perpendicular cross section of circular shape and has a recessed groove extending in a circumferential direction in an inner circumferential surface, a magnetic flux of not less than 99 mT is formed in at least a portion of a space inside the recessed groove by the magnets, the flow-feeding pipe is constituted of a circular pipe, the recessed groove is arranged in a female screw shape in the inner circumferential surface of the circular pipe, and the fine bubbles are amplified inside the flow-feeding pipe.

Here, "electrolytic liquid" shall refer to a liquid that undergoes electrolysis and generates bubbles when an electric current is made to flow.

By thus arranging the recessed groove that extends in the circumferential direction in the inner circumferential surface of the flow-feeding pipe and arranging the magnets radially outside the flow-feeding pipe, a magnetic field is formed inside the recessed groove. When the magnetic field generates a magnetic flux of not less than 99 mT, the electrolytic liquid flowing into and flowing out from the recessed groove is electrolyzed and fine bubbles are generated.

The flow-feeding pipe is preferably arranged such as to be folded back in plurality inside the magnetic field of the magnets. By doing so, fine bubbles can be generated repeatedly inside the electrolytic liquid and therefore, a larger number of fine bubbles can be generated.

Advantageous Effects of Invention

According to the fine bubble amplifier of the present invention described above, a treatment of amplifying fine bubbles efficiently can be performed on a large amount of electrolyzed water.

DESCRIPTION OF EMBODIMENTS

Figure 1A:
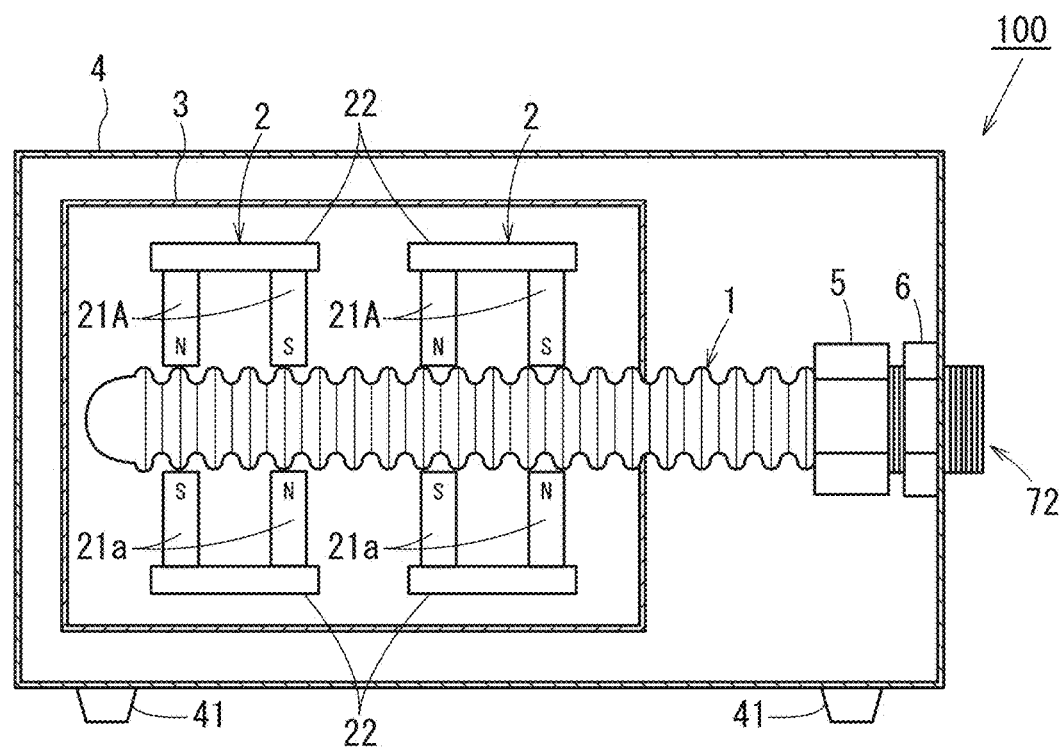
FIG. 1A is a front view and FIG. 1B is a plan view that schematically show a fine bubble amplifier according to a first preferred embodiment of the present invention.

A preferred embodiment of the present invention shall now be described. However, the present invention is not limited to the preferred embodiment described below.

FIG. 1 shows a fine bubble amplifier 100 according to one preferred embodiment of the present invention. The fine bubble amplifier 100 is used to electrolyze an electrolytic liquid A and generate fine bubbles inside the electrolytic liquid A. The fine bubble amplifier 100 mainly includes a flow-feeding pipe 1 that flow-feeds the electrolytic liquid A, a plurality of pairs of magnetic circuits 2, 2, ... and additionally includes an inner casing 3, an outer casing 4, cap nuts 5, 5 and nipple joints 6, 6.

As the electrolytic liquid A, in addition to tap water, mineral water, etc. with which when a current is made to flow, water is electrolyzed and hydrogen and oxygen are generated, that with which, as in saline in which hydrogen and chlorine are generated when electrolyzed, fine bubbles other than hydrogen and oxygen are generated when electrolyzed may be used.

Figure 2:
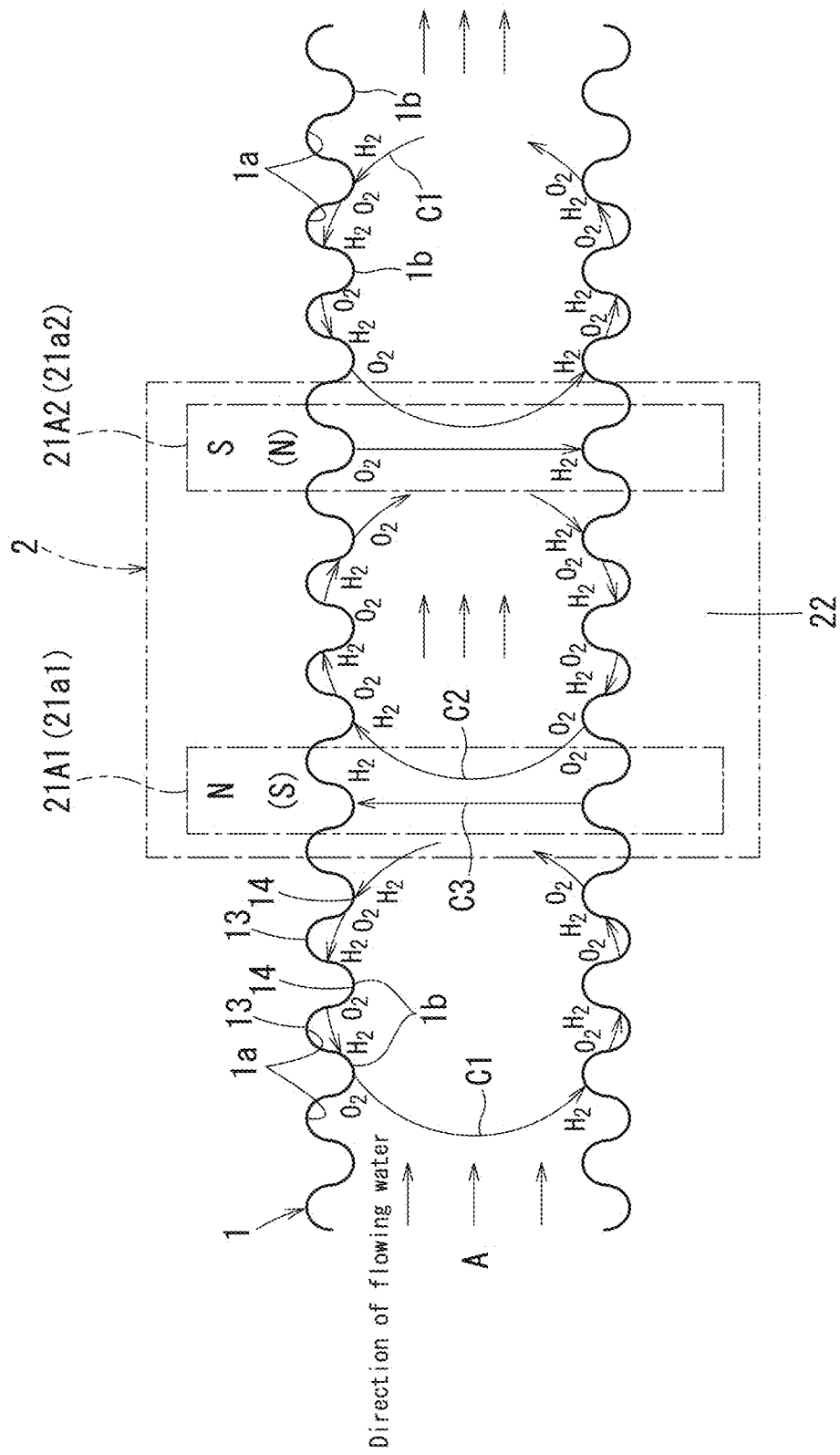
FIG. 2 is an explanatory view of a principle by which electromotive forces are generated in the fine bubble amplifier shown in FIG. 1.

The flow-feeding pipe 1 is made of metal and, as shown in FIG. 2, is constituted of a so-called corrugated pipe with which a circumferential wall alternately projects outward as a crest 13 and recesses inward as a trough 14 repeatedly in a cross section that includes an axial center of the flow-feeding pipe 1. The flow-feeding pipe 1 has an axis perpendicular cross section of circular shape, and is provided with recessed grooves 1a, 1a, 1a, ... of endless circular annular shape that are constituted of inner surfaces of the crests 13, are perpendicular to the axis of the flow-feeding pipe 1, and extend in a circumferential direction of the flow-feeding pipe 1 and projecting ridges 1b, 1b, 1b, ... of endless circular annular shape that are constituted of inner surfaces of the troughs 14 arranged alternately in a length direction.

Figure 1B:
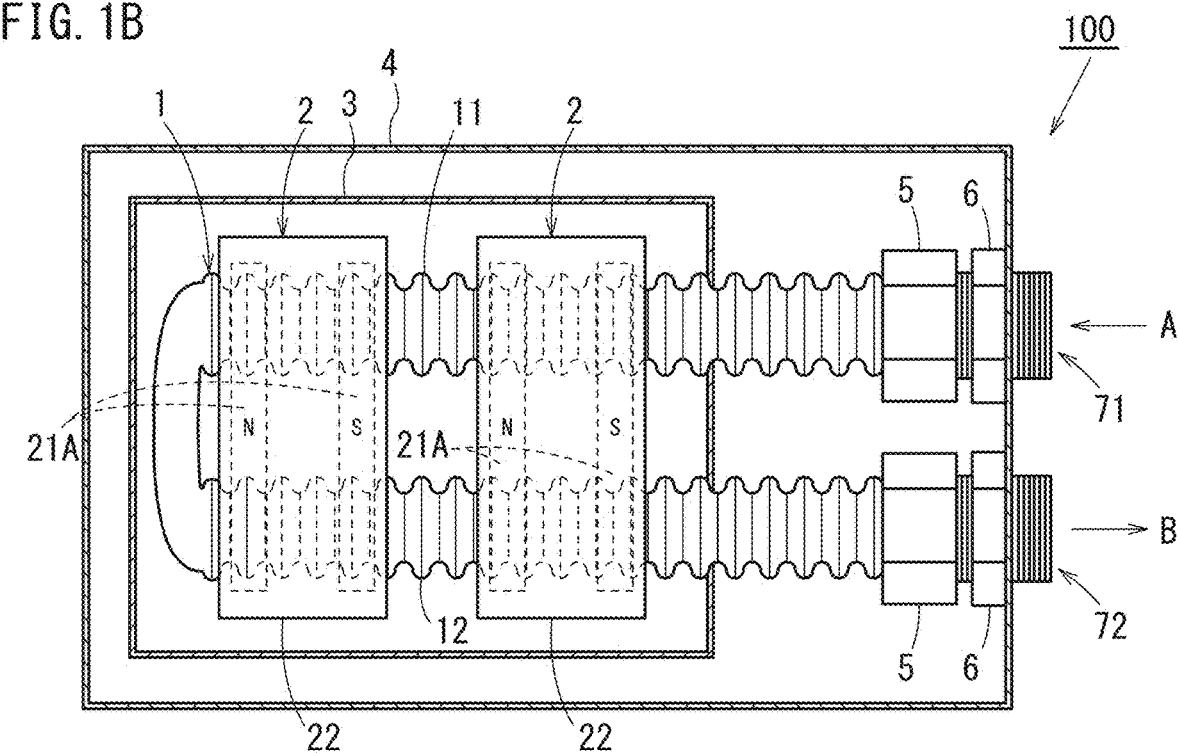

As shown in FIG. 1B, with the flow-feeding pipe 1, a single corrugated pipe is folded in two to arrange two flow-feeding pipes constituted of a supply pipe 11 and a return pipe 12 such that both pass between upper and lower magnets 21, 21 .... Respective ends of the flow-feeding pipe 1 are connected via the cap nuts 5 and the nipple joints 6 to a pipe at an upstream side and a pipe at a downstream side outside the device of the fine bubble amplifier 100.

Figure 3A:
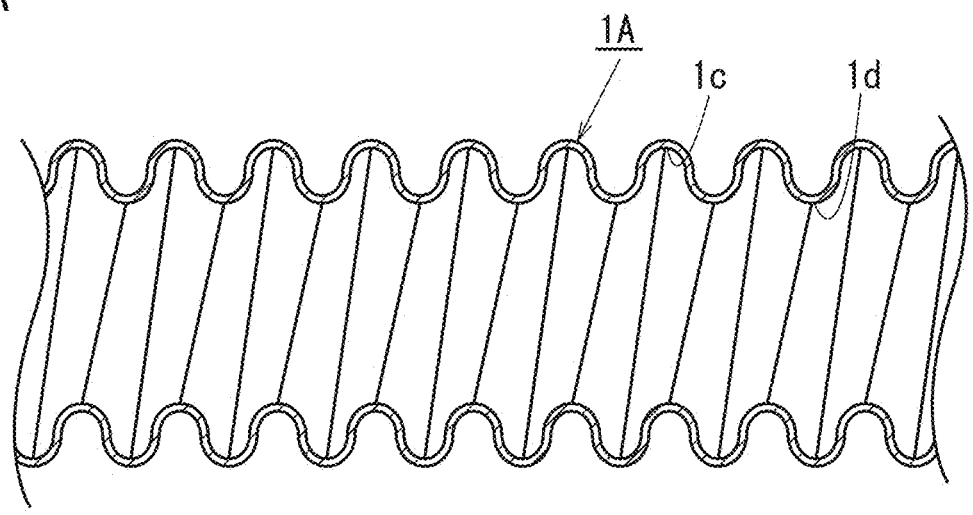
FIGS. 3A and 3B show schematic sectional views showing flow-feeding tubes of other examples.
Figure 3B:
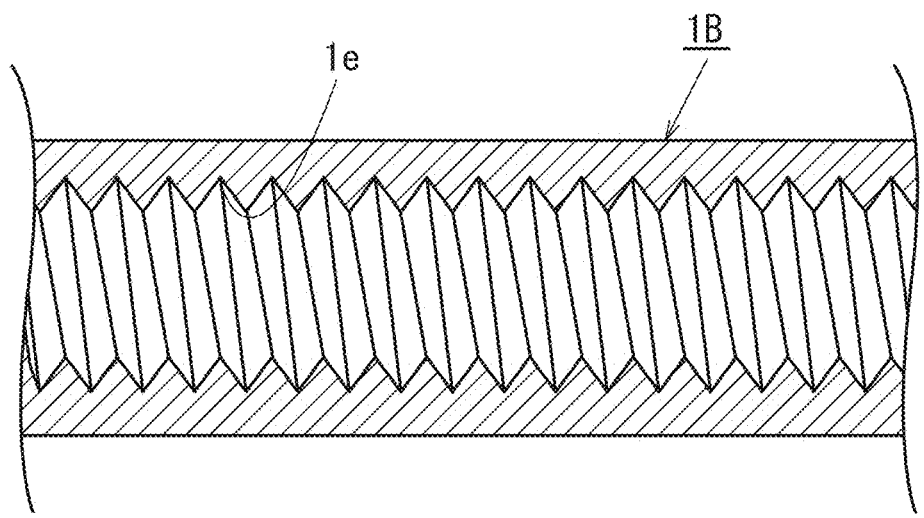

Also, although with the present preferred embodiment, the flow-feeding pipe 1 is constituted of the corrugated pipe of a so-called one pitch type in which each recessed groove 1a is of a circular annular shape, it is not restricted thereto and may be that with which an inner circumferential surface is provided with a recessed groove 1c of spiral shape and a projecting ridge 1d of spiral shape as in a flow-feeding pipe 1A of FIG. 3A. Also, the flow-feeding pipe is not restricted to a corrugated pipe and may be that with which a recessed groove 1e is arranged in an inner circumferential surface of a circular pipe as in a flow-feeding pipe 1B of FIG. 3B. With the example of FIG. 3B, the inner circumferential surface is formed in a female screw shape to enable easy machining.

As a material of the flow-feeding pipe 1, although iron, stainless steel, brass, or other metal can be used as appropriate, an austenite based stainless steel such as SUS 304, etc. that is hardly oxidized and hardly magnetized is preferable. By arranging thus, mixing of rust in the electrolytic liquid can be suppressed.

Each magnetic circuit 2 includes four magnets 21 (21A, 21A, 21a, and 21a) of two pairs that are arranged radially outside the flow-feeding pipe 1 such as to face each other across the flow-feeding pipe 1 and yokes 22, 22 made of iron by which, of the four magnets 21, the two magnets 21A, 21A at an upper side of the flow-feeding pipe 1 are coupled and the two magnets 21a, 21a at a lower side are coupled. The magnets 21A, 21a, ... that face each other vertically across the flow-feeding pipe 1 are arranged such that N poles and S poles face each other across the flow-feeding pipe 1 and such that facing orientations of the N poles and the S poles of the magnets of two pairs adjacent in a length direction of the flow-feeding pipe are reversed. The magnets 21A and 21a of each pair are disposed such as to face each other across both the supply pipe 11 and the return pipe 12 of the flow-feeding pipe 1 in a vertical direction thereof as shown in FIG. 1B.

It is important that a magnetic force formed inside the flow-feeding pipe 1 by each magnetic circuit 2 is not less than 99 mT at least inside each recessed groove 1a and preferably it is not less than 150 mT at a central portion and not less than 200 mT inside each recessed groove 1a at least in a portion of the flow-feeding pipe 1 in the length direction. By such arrangement, fine bubbles can be generated sufficiently inside the flow-feeding pipe 1.

The inner casing 3 is formed by a resin case in a circular cylindrical shape with both ends closed and houses the flow-feeding pipe 1 and the two magnetic circuits 2, 2 in its interior.

The outer casing 4 is formed in a rectangular parallelepiped box shape from austenite based stainless steel and houses the inner casing 3, the case nuts 5, 5 and the nipple joints 6, 6 in its interior. Reference sign 41 in FIG. 1A indicates supporting legs.

When using the fine bubble amplifier 100, the electrolytic liquid A is made to flow in from an inflow port 71 of the flow-feeding pipe 1 and a treated liquid B that contains the formed fine bubbles is taken out from an outflow port 72 as shown in FIG. 1B.

Arrows of C1 and C2 of circular annular shape and arrow C3 of rectilinear shape of FIG. 2 indicate directions of electromotive forces generated inside the electrolytic liquid A flowing through the flow-feeding pipe 1. Magnets 21A1 and 21A2 of FIG. 2 represent those at the upper side (front side of the paper surface of FIG. 2) of the flow-feeding pipe 1 and although not appearing in FIG. 2, magnets 21a1 and 21a2 are arranged at the lower side (back side of the paper surface of FIG. 2) of the flow-feeding pipe 1 such as to face the magnets 21A1 and 21A2 across the flow-feeding pipe 1 from the back side of the paper surface and the magnets 21A1 and 21A2 at the front side of the paper surface and the magnets 21a1 and 21a2 at the back side of the paper surface are arranged such that the N poles and S poles face each other. As the electrolytic liquid A that is flow-fed into the flow-feeding pipe 1 approaches the pair of magnets 21A1 and 21al facing each other across the flow-feeding pipe 1, a magnetic force applied to the electrolytic liquid A and directed from the N pole of the magnet 21A1 at the front side of the paper surface to the S pole of the magnet 21al at the back side of the paper surface strengthens (a density of magnetic flux increases) and therefore, to weaken the magnetic force directed from the front side to the back side of the paper surface in accordance with the so-called corkscrew rule, an electromotive force of a spiral type in a rotational direction as indicated by the symbol C1 is generated to form a magnetic field that is directed oppositely from the back side of the paper surface to the front side of the paper surface. As the electrolytic liquid A departs from the pair of magnets 21A1 and 21al, the magnetic force weakens (the magnetic flux density decreases) gradually and therefore, to strengthen the magnetic force by forming a magnetic field of the same direction as the magnetic field due to the pair of magnets 21A1 and 21al, an electromotive force of a spiral type in a rotational direction as indicated by the symbol C2 that is opposite that of the symbol C1 is generated in accordance with the so-called corkscrew rule. When passing just between the facing pair of magnets 21A1 and 21al, an electromotive force indicated by the arrow C3 of rectilinear shape is generated in a thickness direction of the flow-feeding pipe 1.

As the electrolytic liquid A proceeds further and passes through the next pair of magnets 21A2 and 21a2 facing each other across the flow-feeding pipe 1, an electromotive force is formed in the rotational direction of C2 with approach and in that of C1 with departure since the pair of magnets 21A2 and 21a2 is opposite in electrolysis direction with respect to that of the prior pair of magnets 21A1 and 21al.

Figure 8:
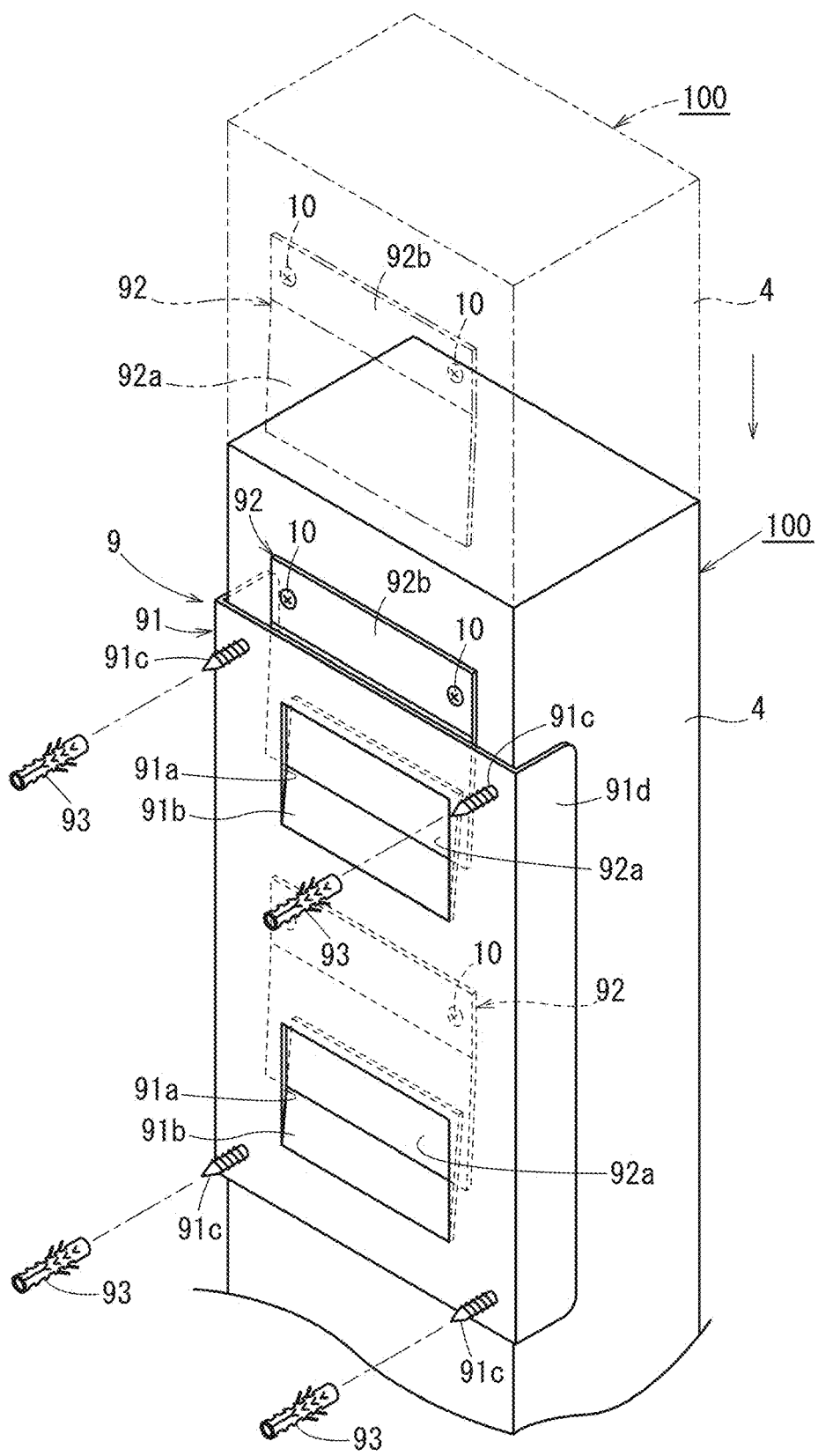
FIG. 8 is a perspective view showing a method for mounting the fine bubble amplifier of the present invention on a wall.

In regard to an installation method, the fine bubble amplifier 100 may be placed on a horizontal surface using the supporting legs 41, 41, . . . such that the flow-feeding pipe of U shape is set horizontally as shown in FIG. 1A or can be mounted on a wall surface using a wall surface mounting metal fitting 9 such that the flow-feeding pipe 1 is oriented in an inverted U shape as shown in FIG. 8.

As shown in FIG. 8, the wall surface mounting metal fitting 9 includes a wall-side stay 91 with which a lateral cross section is of a flat square U shape and a pair of upper and lower hooks 92, 92 at the device side with each of which a longitudinal cross section is of an "inverted V" shape. The wall-side stay 91 includes hooking holes 91a, 91a of square U shape that is arranged by inclining a pair of upper and lower hooking plates 91b, 91b of rectangular shape and is open upward and to the right and left. Each hook 92 includes a mounting portion 92b that is fixed to the casing 4 of the fine bubble amplifier 100 by screws 10 and an insertion plate 92a that is inclined such as to separate somewhat from the casing 4 with respect to the mounting portion 92b.

In mounting the fine bubble amplifier 100 on the wall surface, anchors 93, . . . are driven into the wall surface in advance and the wall-side stay 91 is fixed to the wall surface by wooden screws 91c, . . . with ribs 91d, 91d at both ends being opposite the wall surface side.

By inserting the insertion plates 92a of the hooks 92, 92 mounted on the fine bubble amplifier 100 into the hooking holes 91a and pulling down, the hooking plates 91b is sandwiched by the insertion plates 92a and a wall surface of the outer casing 4 and the fine bubble amplifier 100 is mounted on the wall-side stay 91.

Next, examples related to the first preferred embodiment shall be described.

Example 1

(Fine Bubble Amplifier 100)

As the flow-feeding pipe 1, a flexible tube (product number 6710-20×10 manufactured by KAKUDAI MFG. CO., LTD.) of nominal diameter 20A (outer diameter: 19.9 mm; inner diameter: 15.5 mm; measured by calipers) and 640 mm total length made of SUS 304 and being folded in two as shown in FIG. 1B was used. For each magnetic circuit 2, neodymium magnets with a surface magnetic flux density of 493 mT were used as the magnets 21 and soft magnetic iron plates were used as the yokes 22. A pitch of the magnets 21A, 21A and the magnets 21a, 21a aligned in the length direction of the flow-feeding pipe was set to 34 mm.

(Measurement of Magnetic Field)

The flow-feeding pipe 1 and the magnetic circuits 2, 2 were housed inside a circular pipe casing made of resin to arrange the fine bubble amplifier 100 of Example 1. Results of measuring a magnetic field on an axis center and a magnetic field at both end portions in the vertical direction of the flow-feeding pipe 1 between the magnets 21A and the magnets 21a facing each other are shown in Table 1.

(Electrolytic Liquid A)

As the electrolytic liquid A, purified water (conductivity: 0 μS/cm$^2$; OMRO-20L manufactured by MonotaRO Co., Ltd.) for industrial use made using an ion exchange membrane was adjusted to have a conductivity equivalent to tap water of 130 μS/cm$^2$ by dissolving sodium chloride (product number 19001895 manufactured by Hayashi Pure Chemical Ind., Ltd.). The conductivity was measured by a waterproof conductivity meter CD-6021 manufactured by CUSTOM Corporation.

(Forming of Treated Liquid B)

The electrolytic liquid A was flow-fed into the flow-feeding pipe 1 at a flow rate of 20 liters per minute from the inflow port 71 of the fine bubble amplifier 100 and an electrolytic liquid flowing out from the outflow port 72 was handled as the treated liquid B.

(Measurement of Hydrogen Concentration)

On the treated liquid B, degassing sampling into an aluminum pack (product number: AAK-2) manufactured by GL Sciences Inc. was performed by a method of performing depressurizing while applying ultrasonic waves and on the sampled gas, measurement of volume concentration of hydrogen gas was performed using a catalytic combustion type hydrogen concentration meter (product number: XP-3110H2) manufactured by NEW COSMOS ELECTRIC CO., LTD.

(Measurement of Concentration and Particle Diameter of UFBs)

TOSSLEC Co., Ltd. was requested to perform measurement of concentration and particle diameter of ultrafine bubbles (UFBs) using NanoSight NS300 manufactured by Quantum Design Japan on the treated liquid B. Measurements were performed five times and averages values thereof were used for the concentration and the particle diameter.

Test Example 1

Measurements of hydrogen concentration and concentration and particle diameter of UFBs by the same measurement methods as in Example 1 were performed on the electrolytic liquid A used in Example 1 (without passing through the fine bubble amplifier 100).

Comparative Example 1

Except using a SUS 304 pipe of nominal diameter 15A (outer diameter: 21.8 mm; inner diameter: 15.6 mm; measured by calipers) as the flow-feeding pipe, measurements of hydrogen concentration and concentration and particle diameter of UFBs were performed on the treated liquid B obtained in the same manner as in Example 1.

Results obtained for Example 1, Test Example 1, and Comparative Example 1 are shown in Table 1. Here, the concentration and particle diameter of UFBs represent average values of results of five times of measurements.

TABLE 1

|  | Test Example 1 | Comparative Example 1 | Example 1 |
|---|---|---|---|
| Flow-feeding pipe | Not passed through. | Circular cylindrical pipe | Corrugated pipe |
| Electrolytic liquid | Saline | Saline | Saline |
| UFB concentration (particles/ml) | $4.71 \times 10^5$ | $4.33 \times 10^6$ | $1.26 \times 10^7$ |
| UFB particle diameter (nm) | 15.5 | 80.3 | 118.9 |
| Hydrogen concentration (% vol) | Less than 0.1 | Less than 0.1 | Not less than 0.5 but less than 0.6 |
| Central magnetic field (mT) | — | 155.4 | 156.6 |
| Magnetic field at both ends (mT) | — | 214.0 | 217.0 |
| Conductivity ($\mu S/cm^2$) | 130 | 130 | 130 |
| Flow rate (L/min) | — | 20 | 20 |

Example 2

Measurement of hydrogen concentration was performed on the treated liquid B obtained in the same manner as in Example 1 except using tap water sampled in Sumiyoshi-ku, Osaka City as the electrolytic liquid A.

Test Example 2

Measurement of hydrogen concentration by the same measurement method as in Example 1 was performed on tap water sampled at the same time as Example 2.

Comparative Example 2

With tap water sampled at the same time as Example 2 as the electrolytic liquid A, the electrolytic liquid A was flow-fed into the same flow-feeding pipe constituted of the same circular cylindrical pipe arranged with the magnetic circuits as in Comparative Example measurement of hydrogen concentration by the same measurement method as in Example 1 was performed on the treated liquid B obtained.

The results of Example 2, Test Example 2, and Comparative Example 2 are shown in Table 2.

TABLE 2

|  | Test Example 2 | Comparative Example 2 | Example 2 |
|---|---|---|---|
| Flow-feeding pipe | Not passed through. | Circular cylindrical pipe | Corrugated pipe |
| Electrolytic liquid | Tap water | Tap water | Tap water |
| Hydrogen concentration (% vol) | Less than 0.1 | Less than 0.1 | Not less than 0.5 but less than 0.6 |
| Central magnetic field (mT) | — | 155.4 | 156.6 |
| Magnetic field at both ends (mT) | — | 214.0 | 217.0 |
| Conductivity ($\mu S/cm^2$) | 130 | 130 | 130 |
| Flow rate (L/min) | — | 20 | 20 |

DISCUSSION

As shown in Table 1, in cases where saline adjusted to have the same conductivity as tap water was used as the electrolytic liquid A, the UFB concentrations of both Comparative Example 1 using the circular pipe as the flow-feeding pipe and Example 1 using the corrugated pipe as the flow-feeding pipe were increased in comparison to Test Example 1 the subject of which was the electrolytic liquid A constituted of saline that was not passed through the flow-feeding pipe. However, whereas with Comparative Example 1, it is considered that since the hydrogen concentration does not differ from Test Example 1, UFBs were not generated but contaminants, etc. were generated, with Example 1 using the corrugated pipe, since not just the UFB concentration but the hydrogen concentration is also increased, it is considered that UFBs of hydrogen are generated. In Example 1, UFBs of chlorine are generated at the same time.

Also, as shown in Table 2, in cases where tap water was used as the electrolytic liquid A, whereas with the treated water of Comparative Example 2 using the circular cylindrical pipe, the hydrogen concentration was equivalent to that of tap water and generation of hydrogen was not seen, with Example 2 in which tap water was treated with the corrugated pipe (fine bubble amplifier 100), since a hydrogen concentration higher than the hydrogen concentration of tap water (Test Example 2) and equivalent to that of Example 1 in which saline was treated with the corrugated pipe was obtained, it is considered that the tap water was electrolyzed and UFBs constituted of hydrogen and oxygen were generated in Example 2.

(Discussion of Magnetic Flux Density Inside the Flow-Feeding Pipe 1)

In regard to the magnetic flux density inside the flow-feeding pipe 1, from the measurement results of magnetic flux density inside the flow-feeding pipe 1 according to Example 1 shown in Table 1, it is considered that UFBs can be generated inside the flow-feeding pipe by setting at least an entire interior of the flow-feeding pipe 1 to not less than 150 mT and setting at least the end portions (interiors of recessed grooves 1a) to not less than 200 mT.

Next, usage examples of the fine bubble amplifier 100 shall be described.

Usage Example 1

Figure 4:
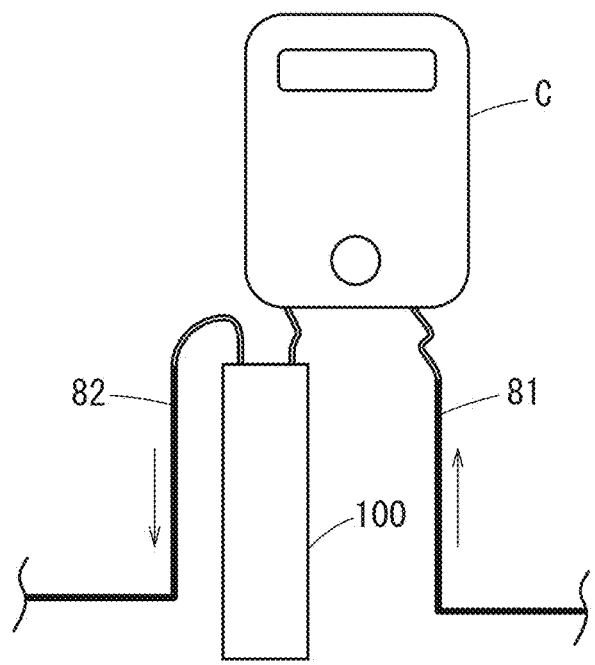
FIG. 4 is a schematic view showing Usage Example 1 of the fine bubble amplifier of the present invention.

FIG. 4 shows an example where the fine bubble amplifier 100 is connected to a water heater C and water containing fine bubbles is supplied to a hot water line. Although in the illustrated example, the fine bubble amplifier 100 is disposed at a secondary side (downstream side) piping 82, the fine bubble amplifier 100 can be disposed at a primary side (upstream side) piping 81 instead. The fine bubble amplifier 100 can also be incorporated in the water heater C to save installation space. The fine bubble amplifier 100 can treat a sufficient amount of water by just a water pressure from the water heater C and therefore, warm fine bubble generated water can easily be obtained simply by attachment to the secondary side piping 82 of the water heater C as described above.

Usage Example 2

Figure 5:
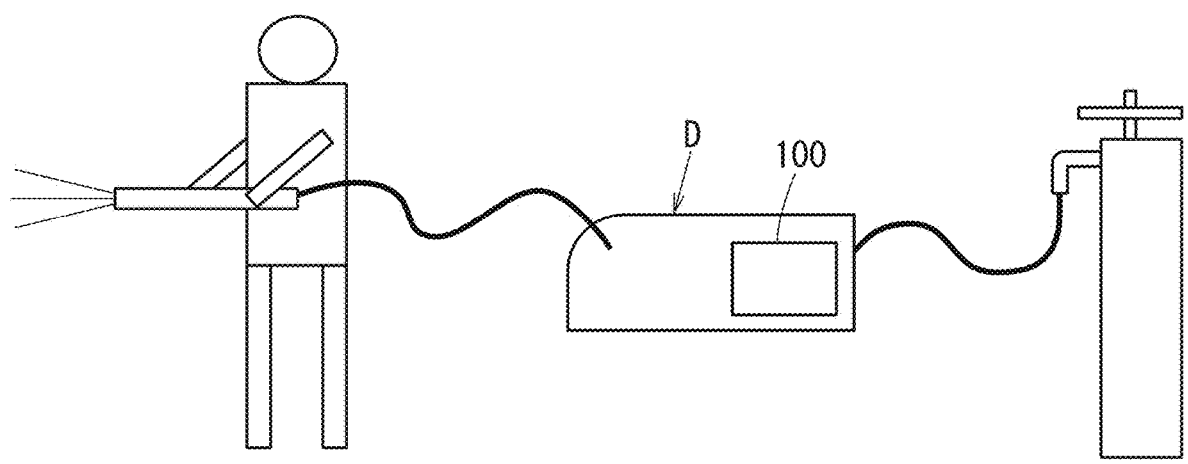
FIG. 5 is a schematic view showing Usage Example 2 of the fine bubble amplifier of the present invention.

FIG. 5 shows a case where the fine bubble amplifier 100 is incorporated in a high pressure washer D. Tap water is made to flow into the high pressure washer D and, after fine bubbles are formed in the tap water by the fine bubble amplifier 100, pressurized by a compressor and jetted out as high-pressure water. With the fine bubble amplifier 100, the resistance of the flow-feeding pipe 1 interior is low and therefore there is no need to arrange a large number of flow-feeding pipes 1 in parallel, the device can be made compact, and incorporation into the high pressure washer D is possible as described above.

Although when washing oil stains of a grease filter of a kitchen with high-pressure washing water, it is necessary to perform water washing with the high pressure washer upon soaking for several hours in caustic soda, etc. to decompose the oil content, caustic soda is a strong chemical that is so dangerous as to dissolve human skin and must be neutralized with acid when discharging into drainage.

By incorporating the fine bubble amplifier 100 of the present invention in the high pressure washer D, oil stains can be washed away simply by spraying the fine bubble containing water emitted from the high pressure washer D onto the dirty grease filter, leaving to stand for several minutes, and thereafter performing high pressure washing again and therefore, a washing time can be shortened significantly and the fine bubble containing water used for washing can be drained as it is.

Usage Example 3

Figure 6:
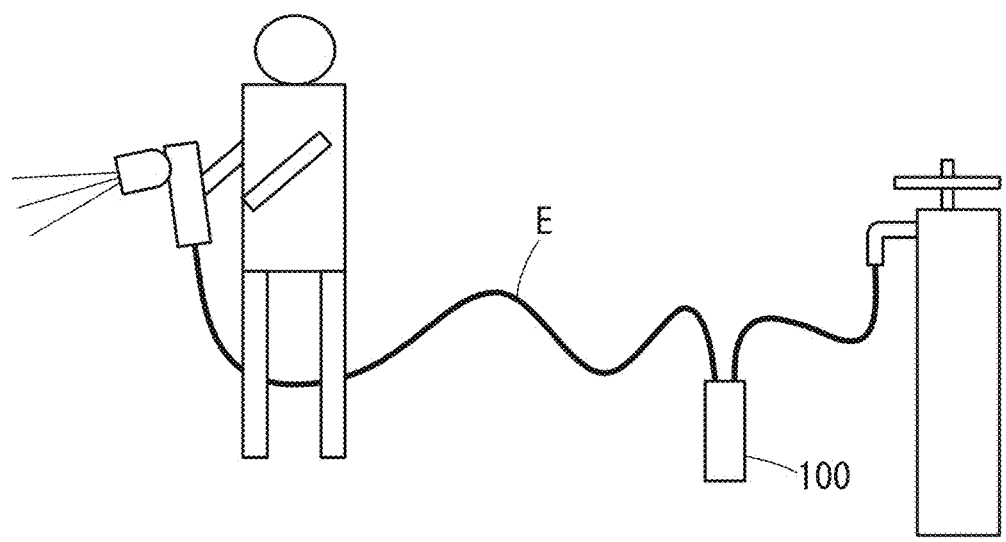
FIG. 6 is a schematic view showing Usage Example 3 of the fine bubble amplifier of the present invention.

FIG. 6 shows an example of combining the fine bubble amplifier 100 with a watering hose E. By arranging thus, living flowers, garden trees, kitchen gardens, etc. can be watered with the fine bubble containing water. By giving plants fine bubbles containing oxygen, growth of the plants can be promoted. With the fine bubble amplifier 100, the resistance of the flow-feeding pipe 1 interior is low and therefore a water discharge pressure of the watering hose E can be secured sufficiently even upon incorporation into the watering hose E as described above.

Usage Example 4

Figure 7:
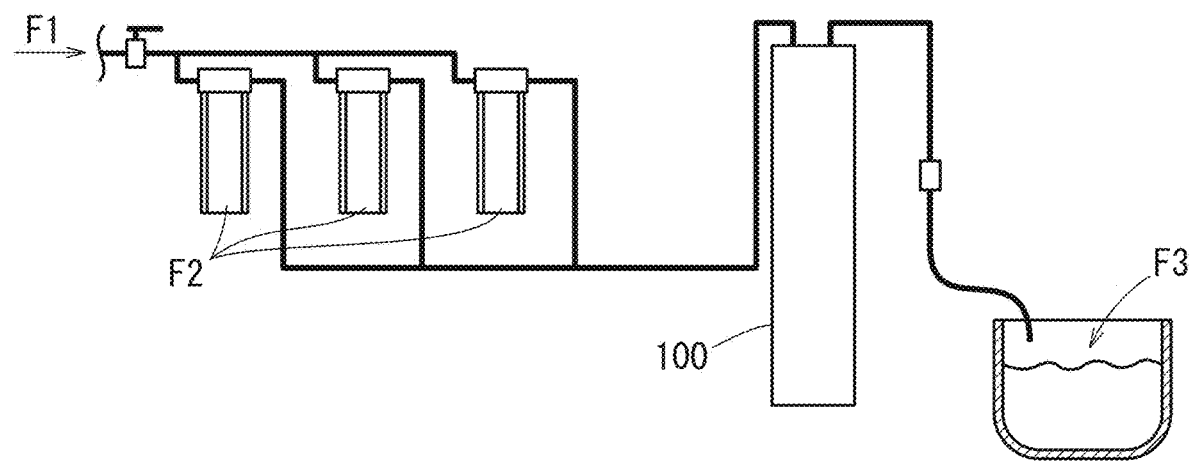
FIG. 7 is a schematic view showing Usage Example 4 of the fine bubble amplifier of the present invention.

FIG. 7 shows an example of incorporating the fine bubble amplifier 100 in a manufacturing process of a refreshing beverage. The fine bubbles of oxygen and hydrogen generated by the fine bubble amplifier 100 are harmless to the human body and can thus be used in the refreshing beverage. A spring water F1, etc. is filtered by a filtration filter F2, . . . and thereafter passed through the fine bubble amplifier 100 to form the refreshing beverage F3 constituted of the fine bubble containing water. The refreshing beverage F3 containing the fine bubbles can be distributed sufficiently as a product because, upon being filled in a glass bottle, aluminum can, or aluminum bag, the fine bubbles are unlikely to be released from the container.

Also, when surface temperatures of hands of the inventor and his mother were measured upon drinking tap water directly and upon drinking a fine bubble containing water formed by passing the tap water through the fine bubble amplifier 100 according to the present invention, whereas when the tap water was drunk directly, the surface temperatures of the hands dropped and it is considered that the blood vessels contracted, when the fine bubble containing water was drunk, the surface temperatures of the hands rose and it is considered that the blood vessels dilated.

The fine bubble amplifier of the present invention described above is not limited to the preferred embodiment described above and, for example, in regard to the magnet, the number of magnets made to face each across the flow-feeding pipe may be one pair or three or more pairs. The direction in which the magnets are made to face each other across the flow-feeding pipe 1 is not restricted to the vertical direction and may be a horizontal direction or a diagonal direction. The flow-feeding pipe may be a single straight pipe instead of being folded in two or may be folded in three or more or a plurality of pipes may be used in parallel.

REFERENCE SIGNS LIST

100 Fine bubble amplifier
1 Flow-feeding pipe
21 Magnet
1a Recessed groove
A Electrolytic liquid

What is claimed is:

1. A fine bubble amplifier amplifying fine bubbles in an electrolytic liquid and comprising:
   a flow-feeding pipe that consists of metal, flow-feeds the electrolytic liquid, and extends rectilinearly; and
   a plurality of magnets that are arranged radially outside the flow-feeding pipe,
   wherein the magnets are constituted of a plurality of pair of magnets arranged with respective N poles and S poles facing each other across the rectilinearly extending flow-feeding pipe and such that facing orientations of the N poles and the S poles of the magnets adjacent in a length direction of the flow-feeding pipe are reversed,
   the flow-feeding pipe has an axis perpendicular cross section of circular shape and has a recessed groove extending in a circumferential direction in an inner circumferential surface, a magnetic flux of not less than 99 mT is formed in at least a portion of a space inside the recessed groove by the magnets, the flow-feeding pipe is constituted of a circular pipe, the recessed groove is arranged in a female screw shape in the inner circumferential surface of the circular pipe, and the fine bubbles are amplified inside the flow-feeding pipe.

2. The fine bubble amplifier according to claim 1, wherein the flow-feeding pipe is arranged so as to be folded back a plurality of times inside the magnetic field of the magnets.

* * * * *